June 9, 1953  A. W. KAMMERER  2,641,447
HOOK TOOTH ROTARY DRILL BIT AND CUTTER
Filed Jan. 9, 1950  2 Sheets-Sheet 1
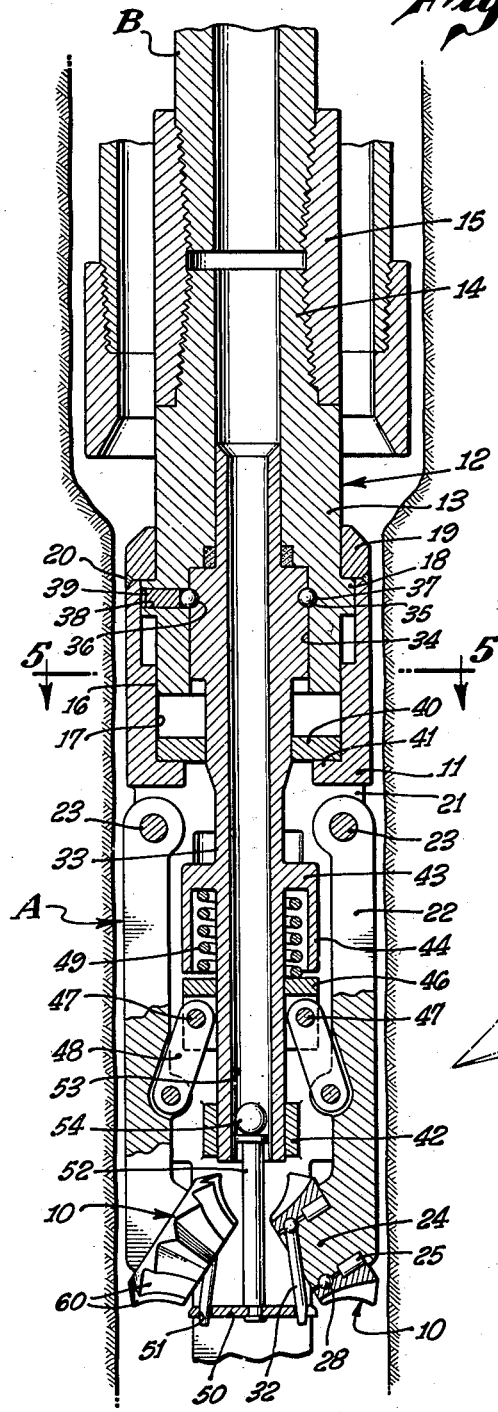
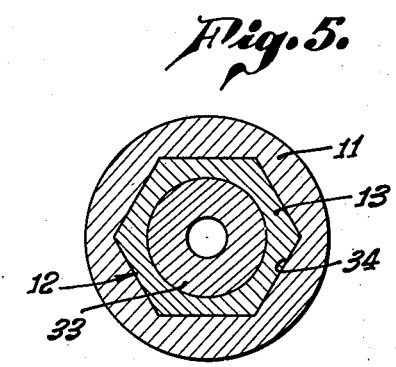
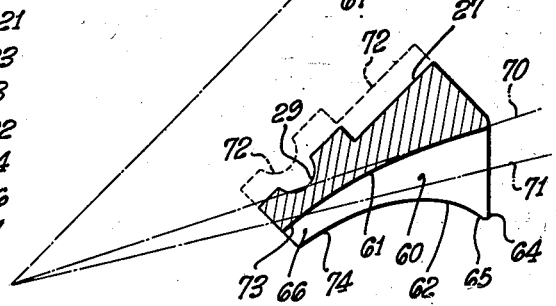
ARCHER W. KAMMERER,
INVENTOR.
BY
Bernard Kriegel
ATTORNEY.

June 9, 1953 — A. W. KAMMERER — 2,641,447
HOOK TOOTH ROTARY DRILL BIT AND CUTTER
Filed Jan. 9, 1950 — 2 Sheets-Sheet 2
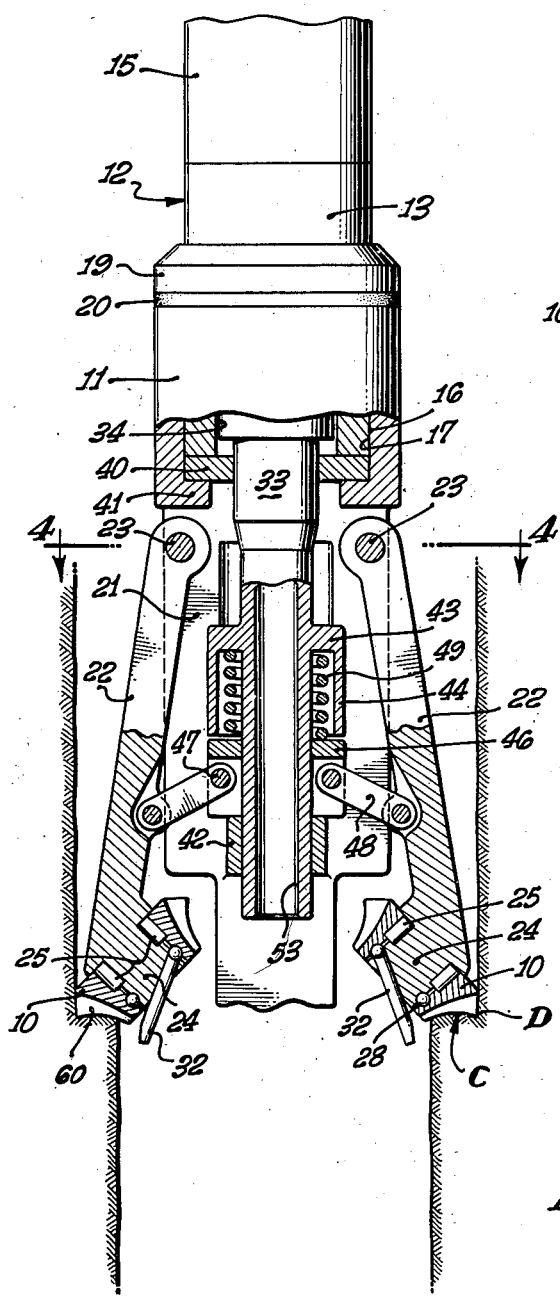
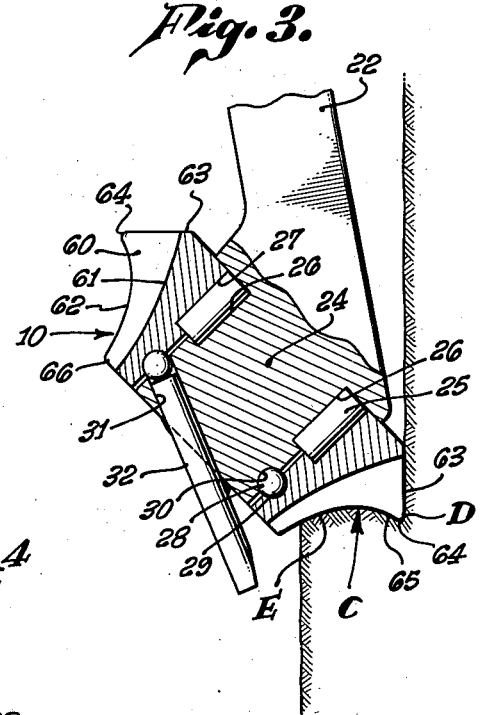
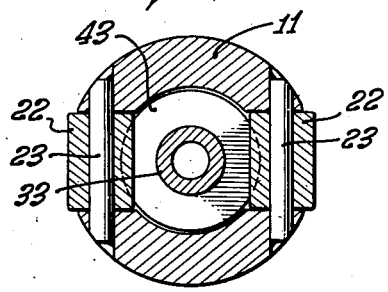
ARCHER W. KAMMERER, INVENTOR.
BY Bernard Kriegel
ATTORNEY.

Patented June 9, 1953

2,641,447

UNITED STATES PATENT OFFICE 2,641,447

HOOK TOOTH ROTARY DRILL BIT AND CUTTER

Archer W. Kammerer, Fullerton, Calif.

Application January 9, 1950, Serial No. 137,537

2 Claims. (Cl. 255—76)

The present invention relates to earth boring tools, and more particularly to drill bits of the rotary type capable of producing a bore hole, or of reaming or enlarging existing bore holes.

An object of the present invention is to provide a rotary drill bit embodying an improved toothed gauge or reaming roller cutter that can form a shoulder in the formation of such shape as to cooperate with the cutter and tend to hold the latter in an outward position during the drilling operation. In this connection, the form of the shoulder produced is such as to minimize or avoid the tendency of the shoulder to break off inadvertently under the drilling weight imposed on the cutter.

Another object of the invention is to provide a toothed side roller cutter for a drill bit that is capable of hooking or keying itself to the formation, in order to minimize or prevent the tendency for the formation to force the cutter inwardly.

Another object of the invention is to provide an improved rotary drill bit having expansible toothed roller cutters that form a shoulder in the formation of such shape as to prevent the formation from tending to squeeze the cutters inwardly; the reactive forces between the shoulder and cutters, in fact, tending to hold the cutters in their desired expanding position.

A further object of the invention is to provide a toothed roller cutter for a rotary drill bit of generally conoidal, frusto-conical or tapered form, in which a greater tooth length is available for operation upon the formation, and in which the depth of tooth at the small end of the cutter is made larger for greater formation penetration.

Another object of the invention is to provide a rotary drill bit toothed roller cutter of generally conoidal form, which enables larger bearings to be incorporated in the bit for transmitting the loads to and from the cutter.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a longitudinal section through a drill bit in a well bore, with its cutters in retracted position;

Fig. 2 is a view similar to Fig. 1, with the cutters in expanded position;

Fig. 3 is an enlarged section through one of the toothed roller cutters and its supporting bearing;

Fig. 4 is a cross-section taken along the line 4—4 on Fig. 2;

Fig. 5 is a cross-section taken along the line 5—5 on Fig. 1;

Fig. 6 is a fragmentary section through one of the cutters.

The drill bit incorporating the invention is disclosed in the drawings as being of the type described and claimed in my application for Expansible Rotary Drill Bits, Serial No. 137,535, filed January 9, 1950. It is to be understood, however, that the invention may be embodied in other types and specific forms of drill bits.

As shown in the drawings, the drill bit A is of the expansible hole enlarging type, which can be attached to the lower end of a string of drill pipe B for lowering through a well casing string (not shown), in order to enlarge the well bore below the casing shoe (not shown). The drill bit cutters 10 are initially held in retracted position, but they can be expanded outwardly, for the purpose of producing an annular formation shoulder C in the well bore upon which the cutters can continue to operate, for the purpose of enlarging the diameter of the well bore along the desired length of hole.

The drill bit includes an elongate main body 11 in which a mandrel 12 is telescoped. The upper portion of the mandrel is constituted by a kelly 13 having a threaded pin 14 screwed into a sub 15, which may form the lowermost portion of the drill pipe string B. The kelly or drill stem member 13 itself is slidably splined in the upper portion of the body 11, as by forming the exterior 16 of the kelly of hexagonal shape, fitting within a corresponding hexagonal body socket 17. The kelly member has an external flange 18 received within the body, serving the purpose of holding the drill stem member 13 therewithin by engaging a retainer ring 19 disposed over the member above its flange 18 and secured to the end of the body, as by the aid of welding material 20.

The body 11 has a longitudinally extending transverse slot 21 in which a pair of opposed cutter supporting members 22 are disposed. These supporting members have their upper ends mounted on pivot or hinge pins 23 suitably secured to the body. The cutter supporting members or legs 22 each have a bearing supporting pin 24 at the lower end on which a roller side, gauge or reaming cutter 10 is rotatably mounted. Anti-friction bearing elements are disposed between each bearing supporting pin 24 and cutter 10 to reduce the friction therebetween. Thus, roller bearing elements 25 are mounted on a roller race 26 on the pin and are received within an opposed cutter race 27. These bearing elements 25 serve to transmit a substantial portion of the radial loads between the pin 24 and roller cutter 10. Ball bearing elements 28 are disposed between a ball race 29 in the cutter, arranged inwardly of the roller races 26, 27, and an opposed race 30 in the bearing supporting pin 24. The ball elements 28 transmit part of the radial loads and a substantial portion of the axial loads between the cutter and bearing pin. In addition, the ball bearing elements 28 retain the cutter 10 on the pin 24, by preventing its axial movement with respect thereto in both directions.

The roller bearing elements 25 are inserted on the pin race 26 and the cutter 11 then slid over the end of the pin until its roller race 27 is disposed fully over the rollers. The balls 28 may then be inserted through a passage 31 in the pin between the cutter 11 and pin ball races 29, 30, whereupon the passage may be closed by a suitable plug 32 welded, or otherwise suitably secured, to the pin 24. In this manner, the balls 28 are held in proper position between the ball races 29, 30, securing the cutter properly on the pin.

The bearing supporting members 22 and their cutters 11 are opposed to one another and may occupy retracted positions substantially entirely within the confines of the main bit body 11. They may be expanded outwardly of the body to a larger effective diameter than the inside diameter of the casing string through which the bit is moved, for the purpose of enlarging the well bore below the casing shoe. In expanding the cutters 11, their supporting legs 22 are swung outwardly about the hinge pins 23 to a predetermined extent.

The cutters are expanded through the aid of a lower tubular member 33 forming part of the mandrel 12. This member is piloted within a lower socket 34 in the kelly 13. A swivel connection assembles the kelly 13 and lower tubular member 33 together for joint longitudinal movement, while permitting relative angular movement therebetween. Such swivel connection may take the form of ball bearing elements 35 mounted in opposed races 36, 37 on the lower member 33 and kelly 13, the balls being inserted through a passage 38 extending through the kelly flange 18, and being prevented from inadvertent removal from the ball races by a passage plug 39, that is prevented from outward movement by engaging the main bit body 11.

The lower tubular member 33 extends downwardly from its swivel portion and through a thrust and guide member 40 resting upon a body shoulder 41. This thrust member initially is disposed below the lower end of the kelly 13, to allow the mandrel 12 to be moved downwardly, for the purpose of effecting outward movement of the cutters 11, and resisting their inward movement. The lower end of the tubular member 33 is slidable in a lower guide collar 42 integral with the body 11 and forming a support resisting lateral movement or deflection of the tubular member 33.

The tubular member is provided with a cup-shaped thrust head 43 intermediate the upper and lower guides 40, 42, having a depending skirt 44 terminating above a thrust block 46 slidable along the exterior of the mandrel member 33 below the skirt. The block 46 is longitudinally slotted on opposite sides of the mandrel in alignment with the cutter supporting legs 22, to carry a pin 47 on each side of the tubular member on which the upper end of an inclined thrust link 48 is pivoted. The lower end of this link 48 is pin connected to a supporting leg 22.

The cutters 10 are expandible outwardly upon downward movement of the mandrel 12 with respect to the body 11, which causes the lower end of the thrust skirt 44 to engage the block 46 and shift it downwardly. Such downward movement swings the legs 22 outwardly about their hinge pins 23 through the agency of the thrust links 48. If desired, outward expansion of the cutters 10 and their supporting legs 22 may be accomplished by a helical compression spring 49 disposed within the skirt 44 and bearing upon the thrust head 43 and thrust block 46. It is apparent that this spring 49 tends to urge the thrust block 46 downwardly and the legs 22 in an outward direction.

The cutters 10 may be locked in retracted position by a holding plate 50 having holes 51 receiving the lower ends of the ball retaining plugs 32. The plate 50 will prevent outward expansion of the cutters 10 until removed from the plugs 32. Such removal is effected hydraulically by securing a central rod 52 to the plate and projecting it upwardly into the central passage 53 formed through the mandrel. A ball 54 may be disposed in the passage, the ball having a diameter substantially equal to the diameter of the passage, in order to function as a piston and enable fluid under pressure within the drill pipe B and drill bit A to force the central rod 52 downwardly and remove the holding plate 50 from the plug elements 32, whereupon the cutters 10 and their supporting members 22 can be shifted laterally outward.

The tool is assembled at the top of the well bore, with the parts occupying the position illustrated most clearly in Fig. 1, in which the holding plate 50 secures the cutters 10 in retracted position, and with the spring 49 (when a spring is used) under maximum compression. The tubular mandrel 12 is disposed upwardly of the body 11, as limited by engagement of its kelly flange 18 with the retainer ring 19. The assembled tool is then lowered through the well casing to a position below the casing shoe at which the underreaming or hole enlarging operation is to commence.

When this location is reached, the pumps at the top of the well bore are started and the fluid in the drill pipe B and bit A is subjected to pressure. Such pressure acts upon the ball 54 and forces both the ball and the central rod 52 out of the passage 53, which removes the holding plate 50 from the plug elements 32 and allows the entire holding device to be ejected from the bit.

Following removal of the holding device, the spring 49 is allowed to expand, urging the thrust block 46 downwardly and, through the thrust links 48, swinging the cutter legs 22 about their hinge pins 23 in an outward direction, in order to force the cutters 10 against the formation wall. The drill pipe and the rotary drill bit are rotated, the cutters 10 digging into the wall and forming the shoulder C therein, the spring 49 expanding and forcing the cutter supporting members 22 and cutters 10 outwardly to an extent limited by engagement of the thrust block 46 with the upper end of the lower body guide 42. When the thrust block has reached this lowermost position within the body, the cutters have been expanded outwardly to their maximum extent.

With the formation shoulder C having been formed, the drill pipe B may be lowered, which will shift the mandrel 12 downwardly within the body 11 to an extent limited by engagement of the kelly with the upper thrust member 40. The drilling weight is then transmitted through the latter member to the body 11, and from the body and hinge pins 23 to the cutter supporting legs 22 and cutters 10. With the imposition of the proper drilling weight, the drill pipe B and tool A can be rotated, to roll the cutters 10 around the formation shoulder C and cause them to dig into the latter.

Each cutter 10 is of generally conoidal or conical form, in order to produce and operate upon an annular formation shoulder transversely of the hole axis, during rolling of the cutters thereupon. The cutter has peripherally arranged teeth 60, the base portions 61 of which are somewhat concave, which is also true of the outer ends 62 of each tooth. The back cone or heel 63 of each tooth is adapted to engage the wall of the enlarged hole and determine the reaming diameter of the tool. Each tooth operates upon the formation shoulder along the tooth length and effects its removal by the usual chipping, tearing or chiseling action common to such teeth.

Each tooth at its back cone or heel portion 63 is extended outward transversely of the cutter, to provide a hook 64 which will dig into the formation and produce an annular groove D in the shoulder when the cutter 10 is in its expanded position. This hook portion 64 of the tooth has an outer edge 65 which is inclined in a downward and outward direction when the cutter is in its fully expanded position, forming a corresponding inclined annular surface in the formation shoulder C. In view of this direction of inclination, the reactive forces between the cutter teeth 60 and the formation shoulder C tend to urge the cutters outwardly, but the cutters cannot move beyond the maximum position to which they have been expanded, because of the engagement of the thrust block 46 with the lower body guide 42.

If the cutter teeth of the cone cutter were formed in the usual manner of bevel gear teeth, the height of each tooth 60 at the smaller end 66 of the cutter would be comparatively small. As a result, the extent of penetration of the teeth into the formation would also be small. Moreover, the formation of the cutter teeth in the fashion of bevel gear teeth would bring the base portions of the teeth closer to the axis 67 of the cutter and would require the entire bearing structure between the cutter and pin to be made correspondingly smaller, because of the necessity for having adequate material between the bases of the cutter teeth and the ball race 29.

The foregoing arrangement is depicted in Fig. 6, in which the usual bevel gear type of cutter tooth is shown by the dashed lines 70, 71, which necessitates the roller and ball races 27, 29 of the cutter 10 and bearing pin 24 to be made of a substantially smaller radius, as indicated by the broken lines 72.

By curving or deviating the base 73 and the outer end portions 74 of the teeth at the small end 66 of the cutter away from and outwardly of the normal base cone 70 of the cutter, the teeth at the small cutter end 66 are disposed outwardly to a greater extent from the axis 67 of the cutter, allowing the ball and roller cutter races to have a much greater radius than was heretofore provided, as shown in full lines in Fig. 6. Thus, the increase in the diameters of the roller and ball cutter races 27, 29 enables the bearing supporting pin 24 and its races 26, 30 to be made of a corresponding greater diameter, increasing the load carrying capacity of the bearing supporting pins considerably, and allowing larger ball and roller bearing elements 28, 25 to be used, with their attendant greater load carrying capacities.

It is apparent that the deviation of the cutter teeth 60 at the smaller end 66 of the cutter away from the cutter base cone 70 axis, or from a nornormal conical position, not only provides a greater height of tooth at this region of the cutter, but also allows larger bearings to be used in the cutter.

The curvature of the teeth away from the base cone 70 provides still another important advantage. As described above, the outer portions 64 of the teeth hook or key into the formation by forming the shoulder groove D, and thereby tend to hold the cutters in their outward position. The tooth portions at the smaller end 66 of the cutter produce a formation shoulder portion E, when the cutters 10 are in their outwardly expanded position which, is inclined in a downward and inward direction. This inner portion E of the shoulder makes an obtuse angle with the smaller diameter wall of the well bore. As a result, the cutters do not have any tendency for breaking down through the formation wall because of the drilling weight, which might tend to cause rifling of the well bore. The convex shape which the cutters produce in the formation tends to stabilize the cutters on the shoulder and cause their teeth 60 to roll around the formation shoulder, for the purpose of cutting it away uniformly and progressively in a downward direction.

The inventor claims:

1. A conical side roller cutter for a rotary well drilling bit having peripheral teeth extending from the large end of the cutter to its small end, the base portions of the teeth at the small end of the cutter being disposed outwardly of the normal base cone of the cutter and the tooth portions at the large end of the cutter having their outer ends extending transversely outward to a greatly increased extent beyond the outer ends of the adjacent intermediate tooth portions, the depth of each tooth portion at the large end of the cutter being greatly increased over the depth of each intermediate tooth portion, the outer end portion of each tooth at the large end of the cutter being inclined to the axis of rotation of the cutter to a greater extent than the outer end of each intermediate tooth portion of the cutter, whereby the tooth portions at the large end of the cutter form hooks with the back cone portions of said teeth.

2. A conical side roller cutter for a rotary well drilling bit having peripheral teeth extending from the large end of the cutter to its small end, the base portions of the teeth at the small end of the cutter being disposed outwardly of the normal base cone of the cutter and the tooth portions at the large end of the cutter having their outer ends extending transversely outward to a greatly increased extent beyond the outer ends of the adjacent intermediate tooth portions, the depth of each tooth portion at the large end of the cutter being greatly increased over the depth of each intermediate tooth portion, whereby the tooth portions at the large end of the cutter form hooks with the back cone portions of said teeth, the outer ends and bases of the cutter teeth being concave lengthwise of the teeth.

ARCHER W. KAMMERER.

References Cited in the file of this patent

UNITED STATES PATENTS

| Number | Name | Date |
|---|---|---|
| 1,571,309 | Wall | Feb. 2, 1926 |
| 1,640,341 | Aldrin | Aug. 30, 1927 |
| 1,708,288 | Wadsworth | Apr. 9, 1929 |
| 1,754,848 | Bull | Apr. 15, 1930 |
| 2,466,991 | Kammerer | Apr. 12, 1947 |